Figure 1:
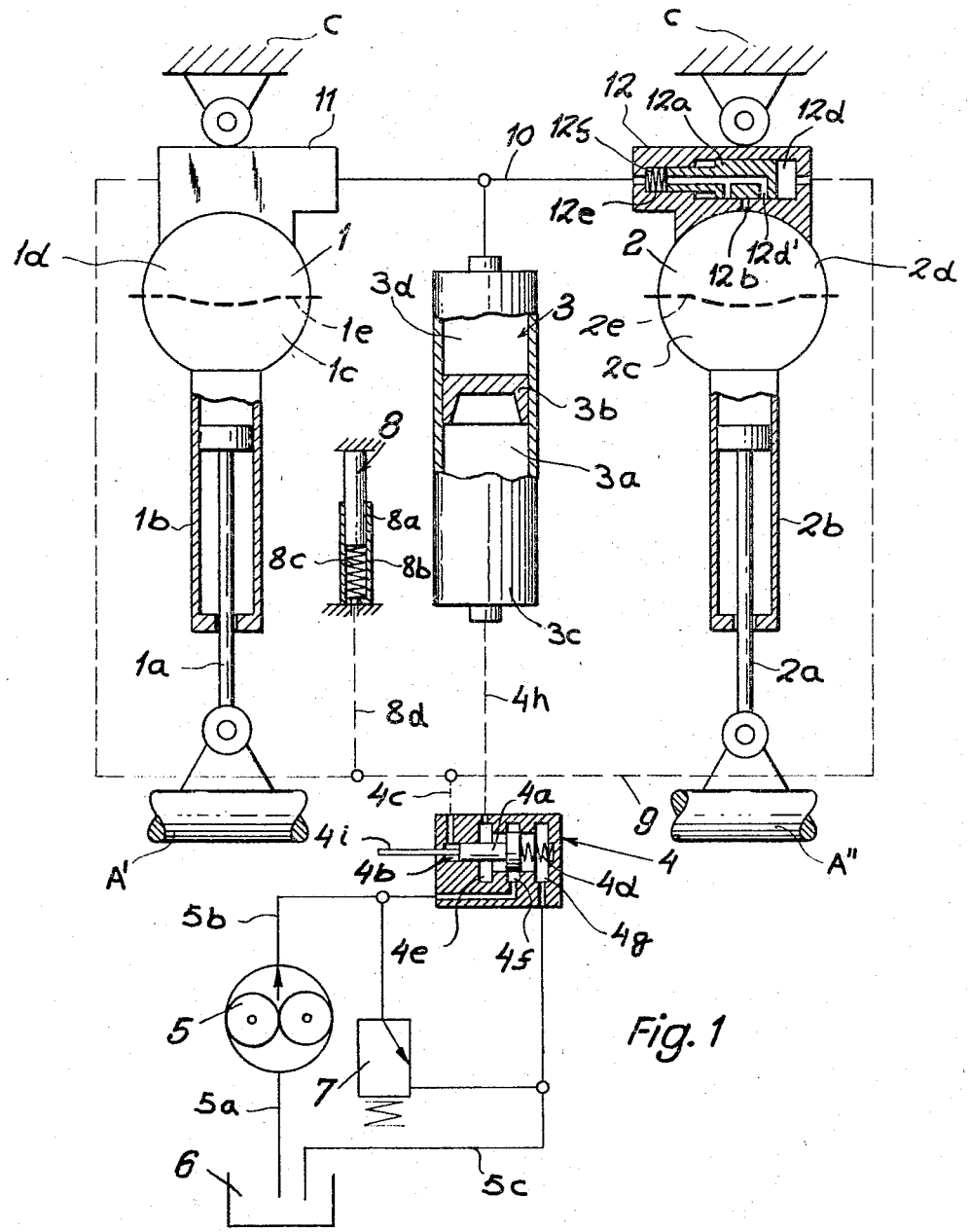

United States Patent Office 3,323,810
Patented June 6, 1967

3,323,810
HYDROPNEUMATIC VEHICLE SUSPENSION
Hans-Christof Klein, Hatterscheim (Main), Germany, assignor to Alfred Teves Maschinen- und Armaturenfabrik KG, Frankfurt am Main, Germany, a corporation of Germany
Filed June 11, 1965, Ser. No. 463,253
Claims priority, application Germany, June 30, 1964, T 26,486
10 Claims. (Cl. 280—6)

My present invention relates to vehicle suspensions and, more particularly, to load and body-leveling hydropneumatic suspensions for automotive vehicles and the like.

It is common practice in the use of hydraulic body leveling devices to employ pneumatic shock-absorbing cushions. Thus it is known to provide hydropneumatic load-leveling elements in which a pneumatic chamber can be separated from the liquid chamber by a membrane, piston or the like and is connected with an air compressor or similar means for generating fluid pressure to compensate the pressure differential across such piston means and restore the original relative positions of the vehicle body and the axles connected by the load-leveling devices thereto. These systems are, however, relatively complex in that they require not only air-compressor means but also special valve means for both the liquid and pneumatic circuits. The systems thus are relatively expensive and have been avoided in many cases.

It is, therefore, the principal object of the present invention to provide an improved system for the hydropneumatic suspension of vehicles and the like which is responsive to changes in the loading of the vehicle for re-establishing a predetermined relative orientation of the vehicle body and the axles connected thereto by the suspension.

Another object of this invention is to provide a vehicle suspension system which is relatively inexpensive and greatly simplified by comparison with earlier systems but yet is effective in load-leveling operations and for shock-absorbing purposes.

These objects and others which will become apparent hereinafter, are attained in accordance with the present invention, by a vehicle-suspension system which comprises selectively extendible suspension means bridging the vehicle body or chassis and at least one of the axles of the vehicle, such suspension elements each including a pneumatic chamber and a liquid chamber separated from the pneumatic chamber by piston means in the form of a floating piston, a membrane or the like; the suspension elements are connected, in accordance with the present invention, via a valve means with a source of hydraulic fluid under pressure, the invention residing at least in part in the provision of distance-sensing means between the axle and the vehicle body for energizing the valve means interposed between the source of liquid pressure and the load-leveling extendible suspending units. The valve means is not, however, connected with the suspending elements directly but through a force-storage means (e.g. a hydropneumatic accumulator means) so that, upon energization of the valve, the floating piston of the latter will generate an elevated fluid pressure which is communicated to the fluid chambers of the suspending units. Thus the system of the present invention comprises, in addition to the load-leveling devices (with a gas chamber and a liquid or hydraulic chamber in force-transmitting relationship therewith), a hydropneumatic accumulator which is charged with hydraulic pressure from a valve which, in turn, communicates with a source (e.g. a pump) of hydraulic fluid, a distance-sensing means preferably in the form of a piston-and-cylinder arrangement being provided for shifting the valve member via fluid pressure.

According to a more specific feature of the present invention, the load-leveling devices are each provided with a respective fluid-operated valve means adapted to regulate the flow of the pneumatic fluid from the gas side of the pressure accumulator into the corresponding chamber of the load leveler. The fluid-responsive valve means of the load levelers can be connected in parallel with the fluid-responsive member of the main valve means between the pressure accumulator and the source of hydraulic fluid.

Figure 2:
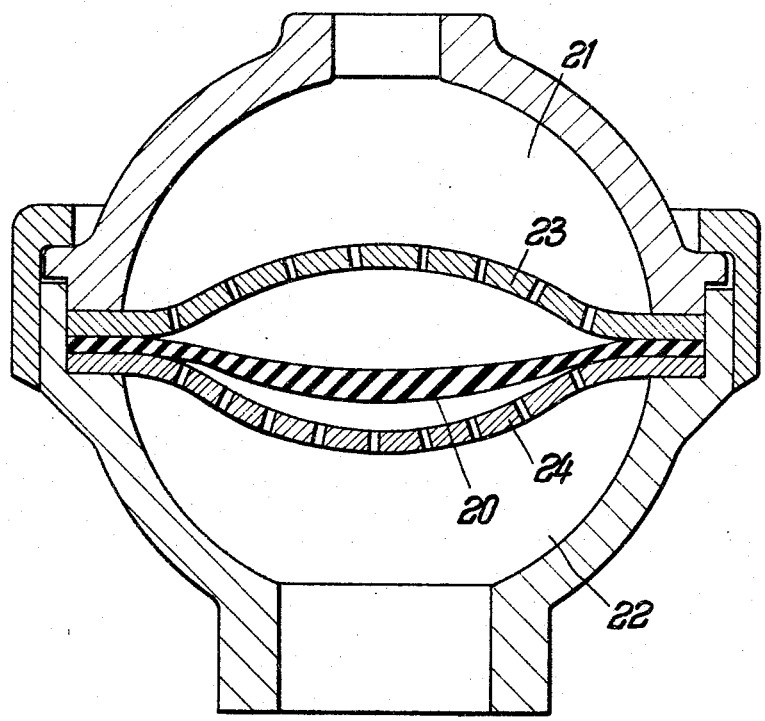

These features, objects and advantages of the present invention will be more readily apparent from the following description, reference being made to the accompanying drawing in which:

FIG. 1 is a somewhat diagrammatic view of a hydropneumatic vehicle suspension system according to the present invention; and FIG. 2 is a vertical cross-sectional view illustrating a component of a system similar to that of FIG. 1.

Referring now to FIG. 1 and the general arrangement of the components of the system, it can be seen that a pair of hydropneumatic load-leveling devices 1 and 2 are connected between the vehicle chassis or body C and respective axles A′, A″ of, for example, the rear wheels of a truck or other automotive vehicle.

The load-leveling devices are of the telescopically extensible type and each includes a respective piston $1a$, $2a$, longitudinally shiftable in a cylinder $1b$, $2b$, of the fluid compartment $1c$, $2c$ of the load-leveling device. The liquid compartments $1c$, $2c$ are separated from the gas compartments $1d$, $2d$ by respective piston-type force-transmitting means such as the flexible diaphragms or membranes $1e$, $2e$.

The system also comprises a hydropneumatic accumulator generally designated 3 whose cylinder $3a$ includes a longitudinally reciprocable floating piston $3b$ which subdivides the cylinder into a hydraulic side $3c$ and a gas side $3d$ both of which are of variable volume depending of course upon the displacement of the floating piston $3b$. The liquid or hydraulic chamber $3c$ of cylinder $3a$ is energized by a positive-displacement-type hydraulic pump 5 via a valve 4 whose function will be described below in greater detail. Pump 5 draws hydraulic fluid from a reservoir 6 via an inlet line $5a$ and discharges the fluid under pressure through the valve 4 via an outlet line $5b$. A pressure-relief or bypass valve 7 is provided between the outlet or high-pressure line $5b$ of the pump 5 and a return line $5c$ communicating with the reservoir. This pressure-relief valve 7 is designed to prevent straining of the pump 5 when the valve 4 is closed; thus when pressure in outlet line $5b$ rises above a predetermined level, the liquid is discharged into the reservoir 6 via this valve.

The valve means 4 is provided with a pressure-responsive valve member whose surface $4b$ forms a piston energizable by fluid pressure from a line $4c$ which, in turn, is supplied with fluid from the control or regulator line 9. Valve member $4a$ is longitudinally reciprocable against the force of a restoring spring $4d$ and, in its extreme left-hand position, communicates between the inlet compartment $4f$ of the valve and the return compartment $4g$ with which line $5c$ is connected. In its extreme right-hand position, the valve member $4a$ permits communication between the inlet $4f$ and the outlet $4e$, the latter feeding a line $4h$ which, in turn, supplies hydraulic fluid to the chamber $3c$ of the accumulator 3. Inlet $4f$ is connected with a high-pressure line $5b$ of pump 5. Each of the load-leveling devices 1, 2 is provided with a respective fluid-operated valve 11, 12, these valves serving to admit air or other gas from chamber $3d$ into the compartment $1d$, $2d$ of the respective load-leveling device via a line 10. For this purpose, the valves 11 and 12 may each comprise a fluid-pressure-responsive valve member 12a which normally blocks the outlet 12b into the chamber 1d or 2d but is provided with a through-going bore 12c communicating between chambers 12d' and 12e of the valve. Chamber 12d is, in turn, fed with a control fluid via the line 9 and this pressure thus displaces the valve member 12a against the force of a restoring spring 12f. When the valve member 12a, seen in FIG. 1, is shifted toward the left as a result of an increase in pressure in line 9, passage 12c opens into an outlet 12b and fluid flow is permitted between the line 10 and the compartment 1d, 2d of the load-leveling device.

The distance-sensing means 8, which can be disposed between any of the relatively displaceable parts of the vehicle chassis or axle so as to yield an indication of relative displacement between them to an off-normal position, can comprise a piston 8a slidable in a cylinder 8b in the manner of a conventional but here diagrammatically represented shock absorber. A compression spring 8c can be provided to resist the downward displacement of the piston 8a into the cylinder 8b which is connected via a line 8d with the control line 9.

The apparatus illustrated in FIG. 1 functions substantially as follows: The adjusting of the desired level of the vehicle body above the axle is carried out by a precharging of the accumulator 3 with hydraulic pressure from the source 5 by, for example, manual actuation of the valve member 4a via the manually displaceable projection 4i of the valve member 4a. When, after the relative positions of vehicle body and axle have been determined, loading of the vehicle results in a telescopic displacement of the piston A into the cylinder A, B of the distance-sensing means 8. Fluid pressure in line 9 increases and the valve member 4a is shifted to the right against the force of spring 4d to permit fluid flow from the pressure line 5b of pump 5 into the hydraulic chamber 3c of the accumulator. Since there is now an instantaneous unbalance between the pressure in chamber 3c and that within chamber 3d, the piston 3b is shifted upwardly (FIG. 1) to increase the pressure in chamber 3d, i.e. compress the gas therewithin. Concurrently with the increase of the fluid pressure in the valve 4 to shift the valve body 4a, the actuating fluid pressure increase is communicated via line 9 to the valves 11 and 12 of the load-leveling devices 1, 2.

Each of these latter valves is constructed, for example, as illustrated for the valve 12, so that fluid under pressure from line 9 entering the chamber 12d will shift the valve member 12a to the left and admit fluid from the chamber 12e and bore 12c to the gas compartment 1d, 2d of the respective load-leveling device. The gas within the chambers 1d and 2d is compressed by unblocking the passages connecting them with the compression chamber 3d which, as previously described, has sustained a pressure increase by virtue of the hydraulic fluid admitted to chamber 3c. The load-leveling gas-cushioned cylinders 1 and 2 are thus loaded at a pressure determined by the vehicle load and the pistons 1a, 2a of these devices are forced downwardly relative to the cylinder portions 2b. In actuality, the load-leveling cylinders will extend to lift the vehicle body with respect to the wheel axles and counteract the telescoping action resulting from loading of the vehicle.

As the elements 1a, 1b and 2a, 2b of the gas-cushioned hydraulic devices 1 and 2 extend under the increase in pressure of their respective chambers 1d, 2d (the pressure being transmitted to the hydraulic fluid in compartments 1c, 2c via membranes 1e, 2e), the relatively shiftable elements 8a and 8b of the distance-sensing means 8 telescope outwardly to follow the separating movement of the vehicle chassis and the axle induced by pressurization of the load-leveling devices 1 and 2. The pressure in line 9 thus falls and valve 4 returns to its idling mode wherein the fluid from pump 5 is bypassed to the reservoir 6 over line 5. Outflow from chamber 3 is blocked and the pressure chambers 3d and 3c are maintained with the load-leveling devices in their extended position.

The drop in fluid pressure in line 9 also permits the valves 11 and 12 to close, thereby blocking the chambers 1d and 2d. Thus the devices 1 and 2 are capable of taking up the momentary shocks in the manner of any gas-cushioned suspension.

When the load or a portion of it is removed from the vehicle, expansion of the fluid in chambers 1d and 3d permits separation of the body and the axles under the force of the usual suspension springs which, as a conventional automotive vehicle, may be coil springs, leaf springs, torsion bars or the like interposed between the axles and the vehicle chassis or body. The relatively shiftable elements 8a and 8b of the body-height detector are drawn apart and the pressure in line 9 reduced. Valve 4 is then actuated to permit hydraulic medium to flow from chamber 3c to the reservoir 9 via outlet 5c, whereupon the pressure falls in chamber 3d and the valves 11 and 12 permit gas to pass from chambers 1d and 2d into line 10. The vehicle body is thereby reduced as the telescopic devices 1, 2 contract to restore the preset body level determined by the pressure in the closed system 1d, 2d, 3d and 10.

The distance-sensing device 8 can be a piston-and-cylinder arrangement in which the telescopic parts are relatively movable by a stroke length equal substantially to the change in spacing of the body and chassis so as to have a direct dependency upon this displacement. It is, however, also possible to constitute the distance-responsive means as a differential-pressure (pressure-multiplying) device. In this case, the fluid cushion suspension elements 1, 2 can be provided at their heads with means for restricting the displacement. Such an arrangement is illustrated in FIG. 2 in which the gas chamber 21 is shown to be separated from the liquid chamber 22 by a flexible membrane 20 disposed between a pair of outwardly concave limiting plates 23 and 24 which are stiffer than the membrane but are elastically deformable under a pressure greater than required for deflection of the membrane 20. Thus as long as the membrane 20 is freely movable (i.e. prior to its contact with one of the plates 23 and 24 between which it is sandwiched), the pressure in the gas chamber 21 and that of the liquid chamber 22 are equal when the membrane 20 is in a static state. Sudden increase in pressure are directly transferred from the fluid in one chamber to the fluid in the other with a lag determined only by the length of time required for the compression or extension of the gas to attain the pressure of the liquid. When the membrane engages one of the plates 23 and 24, a pressure differential develops across the system characterized by the relationship $$\Delta P = P_L - P_G = F_p/A_p$$

where $\Delta P$ is the pressure differential across the membrane 20 when the membrane 20 it has engaged and deflected the perforated spring plate 23, $P_L$ is the pressure on the liquid side $P_G$ is the pressure on the gas side, $F_p$ is the restoring force of the spring plate 23 and $A_p$ is the area of the membrane exposed to the liquid and normal to the direction of the restoring force. A similar relationship can be developed for the pressure differential across the membrane 20 when the latter bears upon the spring plate 24. It may be noted, however, that the sign of the pressure differential will depend upon whether the membrane 20 lies against the plate 23 or again the plate 24. If the $\Delta P$ is positive as in the relationship given, it will be negative when the gas pressure exceeds the liquid pressure. Thus the sign of the differential pressure is directly an indication of whether the vehicle body has raised or lowered with respect to the chassis. This differential pressure can then be supplied to a differential pressure-responsive distance-measuring device (e.g. unit 8 or a force-multiplying valve substituted therefore) for generating the control pressure of line 9.

The invention described and illustrated is believed to admit of many modifications within the ability of persons

I claim:

1. In a hydropneumatic suspension for an automotive vehicle having a body and an axle relatively shiftable vertically with respect to one another upon variation of the loading of the vehicle, in combination at least one fluid-cushioned load-leveling suspension element disposed between said body and said axle, said element having a piston member, a cylinder member receiving said piston member and defining a hydraulic chamber, and means forming a gas chamber in pressure transmitting relationship with said hydraulic chamber; a source of hydraulic medium under pressure; hydropneumatic accumulator means having a hydraulic side adapted to be charged with a hydraulic medium, and a gas side for discharging a gas under pressure upon charging of said accumulator with the hydraulic medium; valve means connected between said source and said hydraulic side of said hydropneumatic accumulator means for controlling the charges thereof with a hydraulic medium; and means responsive to the relative position of said body and said axle for operating said valve means for the charging and discharging of said accumulator means, said gas side of said accumulator means being connected with said gas chamber of said hydropneumatic element for readjusting the relative position of said body and said axle by extension and contraction of said element upon modification of the gas pressure of said accumulator supplied to said gas chamber of said element.

2. The combination defined in claim 1 wherein said valve means is provided with a fluid-responsive valve member controlling the flow of hydraulic fluid from said source to said accumulator, said means responsive to the relative position of said body and said axle including fluid-pressure control means connected with said cylinder for actuating said valve member.

3. The combination defined in claim 2 wherein said control means includes a telescoping piston-and-cylinder arrangement provided with a variable-volume compartment communicating with said valve means and disposed intermediate said body and said axle for telescopic contraction upon loading of said body and telescopic extension upon the unloading thereof to vary the capacity of said compartment.

4. The combination defined in claim 2, further comprising second valve means disposed between said gas side of said accumulator means and said gas chamber and operable upon actuation of the first-mentioned valve means to permit fluid communication between said gas side and said gas chamber.

5. The combination defined in claim 4 wherein said second valve means is provided with a fluid-responsive operating member, further comprising common fluid-transmission means connecting said control means and said first and second valve means for substantially concurrent operation of the latter.

6. The combination defined in claim 2 wherein said accumulator means includes a cylinder having an inlet at one extremity and an outlet at the other extremity, and floating piston means within said cylinder intermediate said extremities.

7. The combination defined in claim 2 wherein said element is provided with a flexible membrane intermediate said gas and hydraulic chambers for transmitting fluid pressure from one chamber to the other.

8. The combination defined in claim 7, further comprising means engageable with said membrane but spaced therefrom and yieldable under the pressure of said membrane for generating a fluid-pressure differential across said membrane.

9. The combination defined in claim 8 wherein said control means includes means operable in response to said fluid-pressure differential generated across said membrane.

10. The combination defined in claim 9 wherein said membrane is flanked by a pair of spaced-apart resiliently deflectable perforated plates between which the membrane is freely displaceable.

No references cited.

BENJAMIN HERSH, *Primary Examiner.*

P. GOODMAN, *Assistant Examiner.*